United States Patent [19]

Yokota et al.

[11] Patent Number: 4,784,480
[45] Date of Patent: Nov. 15, 1988

[54] FOCUSING-IN-PART LENS SYSTEM

[75] Inventors: Hideo Yokota; Yasuyuki Yamada, both of Tokyo, Japan

[73] Assignee: Canon Kabushiki Kaisha, Tokyo, Japan

[21] Appl. No.: 233,188

[22] Filed: Feb. 10, 1981

[30] Foreign Application Priority Data

Feb. 15, 1980 [JP] Japan .................................. 55-17405

[51] Int. Cl.⁴ .......................... G02B 9/42; G02B 9/50; G02B 9/52
[52] U.S. Cl. .................................... 350/471; 350/469; 350/470
[58] Field of Search ............... 350/471, 428, 431, 466, 350/469, 470

[56] References Cited

U.S. PATENT DOCUMENTS

| | | | |
|---|---|---|---|
| 2,503,789 | 4/1950 | Wood et al. | 350/255 |
| 2,537,912 | 1/1951 | Reiss | 350/470 |
| 3,784,285 | 1/1974 | Watanabe et al. | 350/428 X |
| 3,815,974 | 6/1974 | Momiyama | 350/471 X |
| 4,057,329 | 11/1977 | Fleischman | 350/471 |
| 4,124,276 | 11/1978 | Okano et al. | 350/431 |
| 4,311,367 | 1/1982 | Mori | 350/458 X |

Primary Examiner—John K. Corbin
Assistant Examiner—Scott J. Sugarman
Attorney, Agent, or Firm—Toren, McGeady & Associates

[57] ABSTRACT

An objective lens comprising a front lens group of positive power followed by a diaphragm, and a rear lens group of positive power axially movable for focusing and comprised of a plurality of members with the strongest diverging surface of concave curvature being arranged toward the front of the lens.

4 Claims, 9 Drawing Sheets

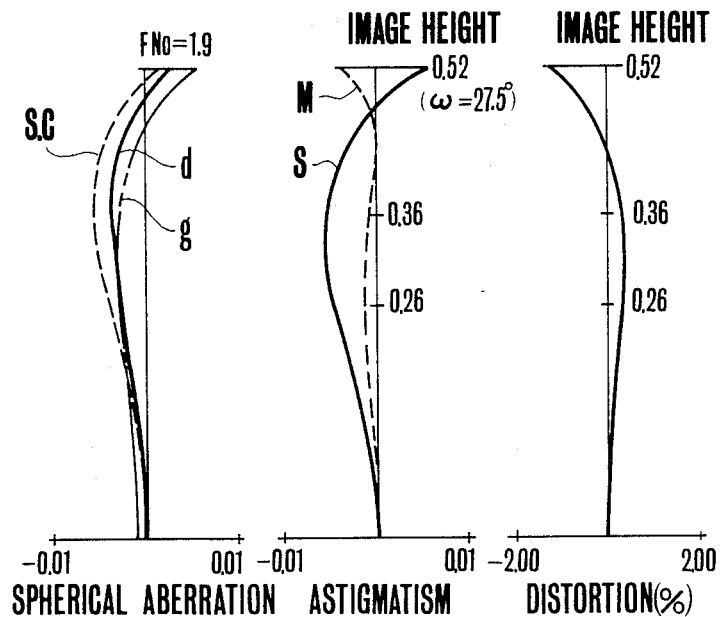
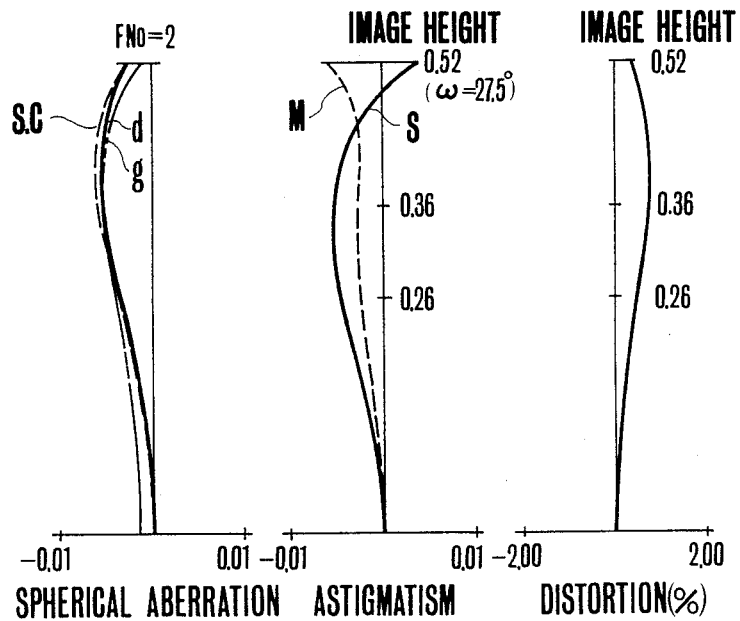

F I G.12
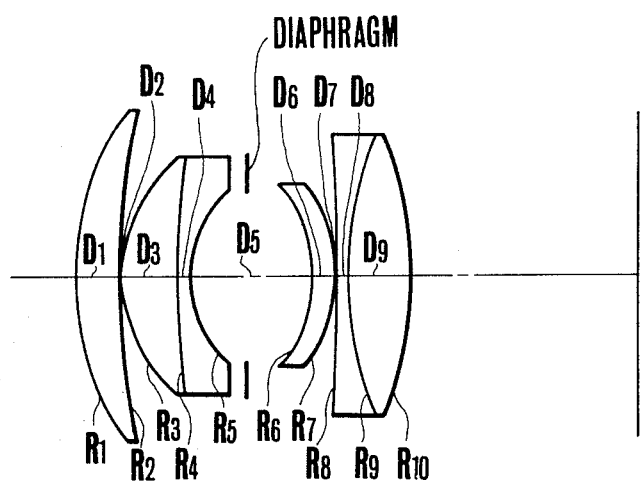
F I G.15
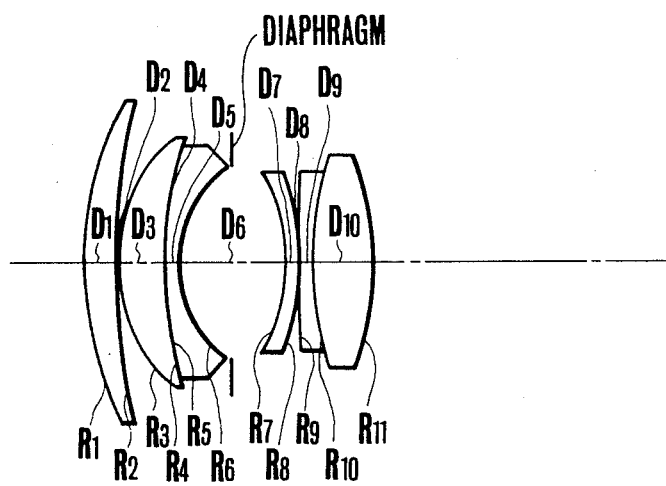

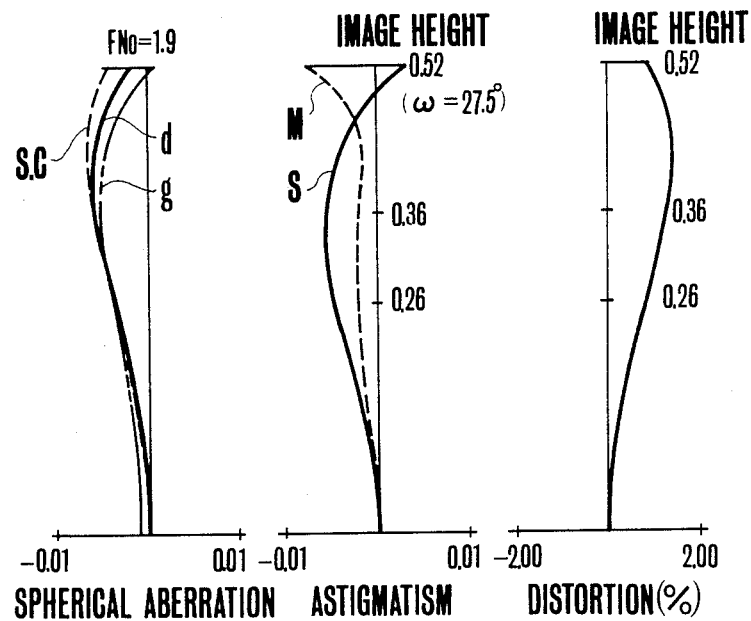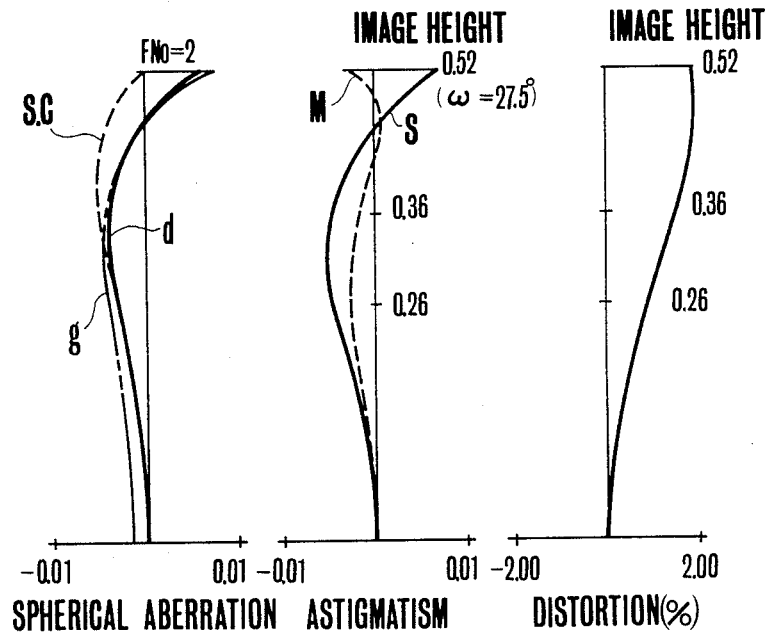

FOCUSING-IN-PART LENS SYSTEM

BACKGROUND OF THE INVENTION

Field of the Invention

This invention relates to mono-focal objective lenses having the standard angle of view or a wider one, and, more particularly, to an objective lens, a portion of which is made axially movable for focusing.

Description of the Prior Art

Recently, the mainstream in the art of lens shutter cameras has adopted the auto-focus mechanism. The conventional objective lenses for this type of camera are not faster than 2.8 in F-number, and a lens having a large relative aperture of at least F/2.0 in the camera has not yet been developed.

The reason for this is that, since most of the existing faster lenses have been designed to be bodily movable for focusing purposes, the mass to be moved to effect focusing is so heavy that the auto-focus mechanism requires an electrical or mechanical driving torque which is much larger than what is available.

It is, therefore, desired to make the focusing provision not for the entire system but at only one group of the lens system.

It is already known in the art to provide a few examples of objectives having the latter focusing provision. For example, U.S. Pat. No. 3,020,804 discloses the use of a triplet type lens in combination with a focusing member in the form of a positive singlet of convex curvature toward the front. Because of that simplest form of the focusing member and the configuration of the front surface of the member to forward convexity, it is difficult to well correct the aberrations, and the range of variation of astigmatism during focusing is very large. And, particularly chromatic aberrations are deteriorated by that singlet lens. Another example of U.S. Pat. No. 2,503,789 is to perform focusing by a negative singlet, with its front surface of concave curvature toward the front, in the rear of a Tesser or Gauss type lens which is stationary during focusing. If this lens system were re-formed to a faster objective lens of relatively wide angle of view, its principal requirement for imaging performance would not compatible with the strengthening of the negative refractive power of the movable or last lens member. Therefore, the focusing member of so weak a power must be moved to a very long distance to cover the required focusing range. Since the height of incidence of the principal ray of the off-axis pencil on the movable lens member varies a large extent with focusing, the range of variation of astigmatism with focusing is largely increased.

Further, in both of the above-described examples, the paraxial ray is incideent on the movable member in strong converging action so that the height of incidence of the paraxial ray on the movable member also varies to a large extent with focusing. This results in a wide range of variation of spherical aberration with focusing, so that it is made difficult for the faster objective lens to preserve a sufficiently high grade imagery throughout the entire focusing range.

Such rear focusing provision is disclosed in U.S. Pat. Nos. 4,045,128 and 4,068,929. But they concern with the telephoto objectives which differ from the short focal length lenses in the method of balancing the various aberrations which determine the image quality. Accordingly, little suggestion can be derived from these telephoto objective lenses.

SUMMARY OF THE INVENTION

An object of the present invention is to provide an objective lens which is moved only in part to effect focusing without causing the spherical aberration to be deteriorated and with the limitation of the variation of field curvature reduced to a minimum, so that practically high grade imaging performance is preserved throughout the focusing range.

Another object of the present invention is to provide an objective lens of high aperture ratio. In an embodiment to be described later, an increase up to F-number 1:2.0 at an angle of view $2\omega=54°$ or more has been achieved.

Still another object of the present invention is to make it posible to perform focusing with a shutter built-in diaphragm maintained stationary throughout.

The faster lens of the invention has a diaphragm, on the object side of which is arranged a front positive lens group and on the image side of which is arranged a rear positive lens group, the above-described rear group including at least one member axially movable for focusing. This movable member is constructed with a plurality of lens elements and having a positive refractive power with its strongest divergent surface of concave curvature toward the front.

Another feature of the invention is that in order to achieve a further improvement of the imaging performance there are set forth the following conditions: That is, in a preferred embodiment, letting F denote the focal length of the entire system FB the focal length of the above-described movable lens member, and FA the overall focal length of the remainder of the entire system excluding the movable member, $$1.2 < FA/F < 2.2 \quad (1)$$

$$0.9 < FB/F < 1.4 \quad (2)$$

are satisfied, and taking an image of the diaphragm formed by the above-described front lens group of positive power in the paraxial region as the entrance pupil and letting IIB denote the total sum of the 3rd order coma aberration coefficients of the movable lens member obtained through the entire system with the object point at infinity, $$|IIB| < 0.3 \quad (3)$$

is satisfied.

A more detailed explanation of the invention will be given at first to the construction and arrangement of the lens system. The lens system of the invention has the focusing provision made at a member lying on the image side of the diaphragm. This focusing member is constructed with a plurality of lens elements. In the case where focusing is performed by imparting an independent movement into part of the entire system, as far as the focusing range is concerned, it is advantageous to select only one singlet of strong power for employment as that part of the entire system for the focusing control mechanism can be simplified in structure. The aberrational problems of lens systems are, however, generally solved by the use of a plurality of constituent lens elements. Therefore, the impartment of such independent movement into the singlet alone leads to the destruction of the balance of the corrected aberrations, and particularly to the deterioration the chromatic aberrations. According to the present invention, deterioration of the aberrations is prevented by constructing the movable member in the form of a plurality of elements. Again, the reason why the movable member is positioned in the rear of the diaphragm is that, while the diaphragm is being maintained stationary focusing can be carried out, thereby giving an additional advantage that there are no moving parts exposed from the camera housing.

Another advantage of the invention arising from the use of a group of lens elements having a positive refractive power as the focusing member is that a large increase in the refractive power of the focusing member does not call for any appreciable decrease in the fundamental imaging performance and can result in a corresponding decrease of the total movement of the focusing member for an equivalent focusing range.

Still another advantage of the invention arising from the configuration of a lens surface that has the strongest diverging action among the lens surfaces of the movable lens group to forward concavity is that, since the off-axis aberrations such as coma and astigmatism can be well corrected for an object at infinity, that is, at the start point of lens design, the range of variation with focusing of astigmatism is limited to a minimum. It will be appreciated from the foregoing that the present invention is to provide a semi-standard wide angle objective lens having a large relative aperture with the focusing provision made at part of the entire system so that the mass required to be moved for focusing is made smaller than was heretofore necessary, while nevertheless the various aberrations are well corrected throughout the entire focusing range. It should be pointed out that the movable lens group may be either preceded, or followed, just by a lens of weak power which remains stationary during focusing.

BRIEF DESCRIPTION OF THE DRAWINGS

FIGS. 10A to 10C and 11A to 11C are graphic representations of the various aberrations of the objeive of FIG. 9 when focused at infinity and down to the shorter object distance of $-25F$ respectively.

FIG. 12 is a longitudinal sectional view of Example 4 of a specific objective according to the present invention.

FIGS. 13A to 13C and 14A to 14C are graphic representations of the various aberrations of the objective of FIG. 12 when focused at infinity and down to the shorter object distance of $-25F$ respectively.

FIG. 15 is a longitudinal sectional view of Example 5 of a specific objective according to the present invention.

DESCRIPTION OF THE PREFERRED EMBODIMENTS

Figure 1:
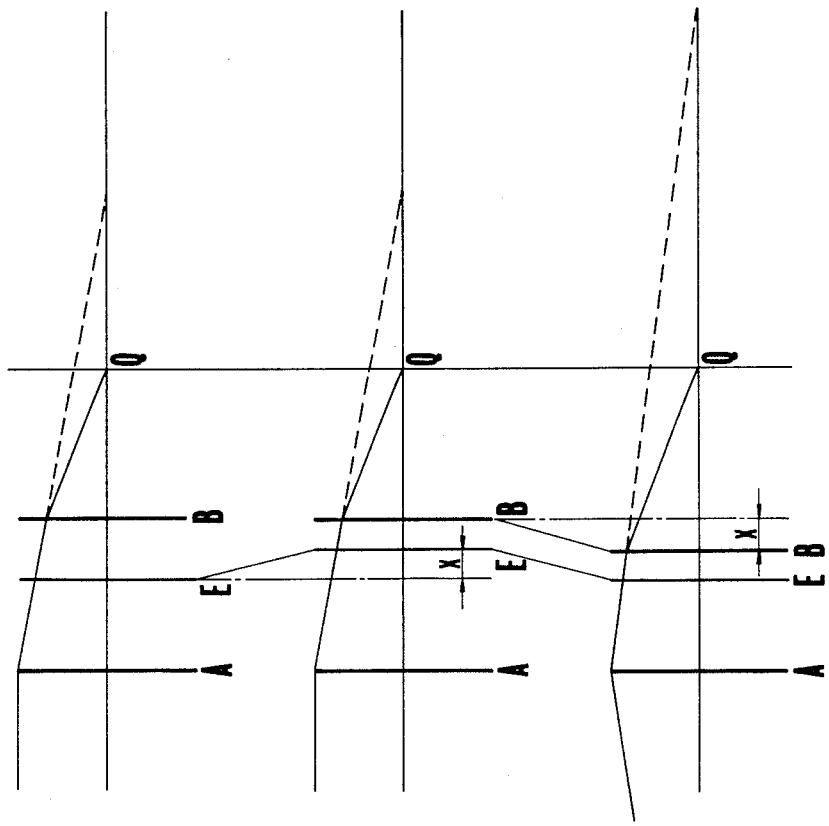
FIGS. 1A to 1C are graphic representations of a refractive power distribution with the variation of aberrations of a lens system.

Each of the above-described conditions will next be explained in greater detail. For better understanding, the movable lens group is hereinafter referred to as Group B, and the entire lens system with the exclusion of the movable lens group to as Group A.

Conditions (1) and (2) represent a power distribution suited for a good state of correction of the various aberrations with the object point at infinity, and making it possible to effect focusing by Group B. When the upper limit of unequality (1) is exceeded, the sagittal surface in the margin of the field is excessively curved to the positive side with the object point at infinity, thus making it difficult to achieve a high grade imaging performance over the range of coverage up to $2\omega=54°$. When the lower limit of inequality (1) is exceeded, Group A produces so large a negative spherical aberration that it becomes difficult to obtain as fast an objective as 1.9 in F-number. Also the paraxial pencil incident upon Group B converges so strongly that the spherical aberration varies to a large extent during focusing.

When the upper limit of inequality of condition (2) is exceeded, the total movement of Group G for an equivalent focusing range is so greatly increased that when focused down to as short an object distance as $-25F$ (where F is the focal length of the system), Groups A and B and diaphragm mechanism will mechanically intereferе with each other. When the lower limit of inequality (2) is exceeded, the meridional surface in the margin of the field becomes excessively curved to the positive side for the object point at infinity just as in the case where the upper limit of inequality (1) is exceeded.

Inequality of condition (3) is set forth to restrict the variation of the curvature of meridional and sagittal fields in the focusing range. When that limitation is violated, where IIB>0, as focusing is effected down to the shortest object distances, the meridional and sagittal fields are extremely curved toward the positive side, and where IIB<0, the meridional and sagittal fields are extremely curved toward the negative side.

As a rule, for a good state of correction of the image aberrations, the various aberrations are corrected by the suitable design of the lens system as a whole. This allows the various lens group constituting the complete system to have over- and under-corrected aberrations, provided that they are balanced out in the total sum. Since the present invention is concerned with the focusing-in-part type lens system, a specific requirement for the focusing lens group is set forth in the form of an inequality of condition (3) so as to prevent variation of field curvature during focusing. This condition restricts the shapes and characteristics of the lens constituents and the conditions for the focal length and the radius of curvature of the lens surface.

We then proceed to prove that the above-cited condition (3) is quite appropriate for good stability of aberration correction throughout the focusing range within the framework of conditions (1) and (2). For better understanding of the following disucssion, here are summarized the construction parameters as follows:

(a) The numerical data of the parameters are normalized with respect to a focal length of f=1.0;

(b) The normalized radii of curvature of the first to the last lens surfaces counting from the front are designated by $\bar{r}1$ to $\bar{r}m$ respectively;

The axial separation between the i-th and (i+1)th lens surfaces and the index of refraction of the medium therebetween by di and Ni respectively;

The reduced axial air separation by $ei = di/Ni$;

The refractive power of the i-th surface by $$\psi_i = \frac{Ni - N(i-1)}{\bar{r}i}$$

particularly with the refractive powers of the first and last of m-th surfaces by $$\psi_1 = \frac{N1 - 1}{\bar{r}1} \text{ and } \psi_m = \frac{1 - Nm}{\bar{r}m}$$

respectively.

(c) As the ray-tracing formulas in paraxial region use is made of:

$$\alpha_i' = \alpha_i + \psi_i h_i$$

$$h_i = h_{i-1} - \alpha_i e_i$$

$$\alpha_i = \alpha'_{i-1}$$

where $\alpha_i$: the reduced angle of inclination of an entering ray; and $\alpha_i'$: the reduced angle of inclination of an emerging ray.

(d) Equations defined in (c) are given initial values $\alpha_1 = 0$ and $h1 = 1$ when the rays from the paraxial object are traced;

(e) To distinguish the rays of paraxial pupil from those used in the ray tracing of (d), letting $\bar{\alpha}_i$ and $\bar{\alpha}_i$ designate the angles of inclination of the entering and emerging rays and $h_i$ the height of incidence, the equations (c) are rewritten as follows:

$$\bar{\alpha_i'} = \bar{\alpha}_i + \psi_i \bar{h}_i$$

$$\bar{h}_i = \bar{h}_{i-1} - \bar{\alpha}_i e_i$$

$$\bar{\alpha}_i = \bar{\alpha}'_{i-1}$$

(f) The paraxial image point of the diaphragm by Group A is measured from the first surface and this distance is designated by T1. With the given initial values $\bar{\alpha}_1 = -1$ and $\bar{h}_1 = -T_1$, then the paraxial rays from the pupil are traced by the equations (e). Then, the coma aberration coefficient $II_i$ for the i-th surface is calculated based on the following formula:

$$II_i = h_i\left(h_i \frac{N_{i-1}}{\bar{r}_i} - \alpha_i\right)\left(\bar{h}_i \frac{N_{i-1}}{\bar{r}_i} - \bar{\alpha}_i\right)\left(\frac{\alpha_i'}{N_i^2} - \frac{\alpha_i}{N_{i-1}^2}\right)$$

where $N(i-1)=1.0$ when $i=1$, and $Nm=1.0$ when $i=m$. Then, as the first surface in the movable group or Group B behind the diaphragm is the j-th one, we have the comma coefficient of Group B as expressed by:

$$II_B = \sum_{i=j}^{l} II_{io}$$

where l is the last surface in the movable group and is found as $j < l \leq m$.

The fact that condition set forth in the form of an inequality (3) is appropriate is next proved in connection with the 3rd-order spherical, coma, astigmatism and distortion aberration coefficient and the Petzval sums of Groups A and B designated by IA, IIA, IIIA, VA and IVA, and IB, IIB, IIIB, VB and IVB respectively.

Here we look upon the above-described variation of curvature of the meridional and sagittal fields in terms of the aberration coefficients.

As Group B moves, the focal length of the entire system is caused to change. But the changed lens data resulting from the movement of Group B are not subjected to normalization again. Therefore, letting FN denote the focal length of the entire system for the object at infinity, that is, at the start point of lens design, and y the image height and using the 3rd-order astigmatic aberration coefficient III of the entire system and the Petzval sum IV of the entire system, the amount of curvature of the meridional field M and the amount of curvature of the sagittal field S may be expressed by:

$$M \approx -\frac{1}{2}(3III + IV) \cdot \left(\frac{y}{F_N}\right)^2 \cdot F_N$$

$$S \approx -\frac{1}{2}(III + IV) \cdot \left(\frac{y}{F_N}\right)^2 \cdot F_N$$

Since the Petzval sum remains unchanged with respect to the movement of Group B, it is understood that the astigmatic aberration coefficient III governs the curvature of field and variation of astigmatism.

Now, the magnitude of variation of the aberration coefficient has to be determined. To this end, we consider the transformation of the aberration coefficient after focusing.

In FIGS. 1A to 1C there is a power distribution over the lens system focused for an infinitely distant object at FIG. 1A where A represents the front group, B the movable or rear group and E the diaphragm.

At FIG. 1C there is shown a change of the power distribution as Group B is moved toward Group A by a distance x to effect focusing down to a shorter object distance, while the distance from Group A to a focal point Q is maintained constant.

The aberration coefficient is then transformed as follows:

(a) With the object point remaining unchanged in position from infinity, the diaphragm is displaced by the x toward Group B as shown in FIG. 1B, thereupon Group B is subjected to transformation in the pupil displacement. The transformed aberration coefficient for Group B is represented by IIBP.

(b) The object point is brought to a shorter distance, and the diaphragm E and Group B are simultaneously displaced by the x toward the Group A as shown in FIG. 1C, thereupon Group A is subjected to transformation of the object displacement. The transformed aberration coefficient is represented by IIIA$\theta$. Group B after having been subjected to transformation of the pupil displacemet is subjected to further transformation of the object displacement. The resultant aberration coefficient is represented by IIIB$\theta$. Hence we have the transformed coefficient of the entire system after these displacements as III$\theta$=IIIA$\theta$+IIIB$\theta$.

Then we have to define the individual items of this equation for transformation as follows:

For Group A,
$$IIIA\theta = IIIA - \delta_A(2V_A + (\bar{\alpha}_A')^2 - (\bar{\alpha}_A)^2) + \delta_A{}^2 I_{SA} \quad (4)$$

where IIIA is the aberration coefficient for the infinitely distant object;

$$\delta_A = \frac{\bar{\alpha}_{A\theta}}{\bar{\alpha}_A}(h_A \alpha_{A\theta} = h_{A\theta}\alpha_A) \quad (5)$$

$\bar{\alpha}_A$: The reduced inclination angle of a pupil-paraxial ray incident on Group A before the object is displaced;
$\bar{\alpha}_{A\theta}$: The reduced inclination angle of a pupil-paraxial ray incident on Group A after the object is displaced;
$h_A$: The height of incidence of an object-paraxial ray on Group A before the object is displaced;
$\alpha_A$: The reduced inclination angle of an object-paraxial ray on Group A before the object is displaced;
$h_{A\theta}$: The height of incidence of an object-paraxial ray on Group A after the object is displaced;
$\alpha_{A\theta}$: The reduced inclination angle of an object-paraxial ray incident on Group A after the object is displaced;
$\bar{\alpha}_A'$: The reduced inclination angle of a pupil-paraxial ray emerging from Group A before the object is displaced;
$I_{SA}$: The spherical aberration coefficient of the pupil of Group A; and
$V_A$: The distortion aberration coefficient of Group A.

On calculation of the aberration coefficient, $\bar{\alpha}_A = -1$, $r_A = 1$ and $\alpha_A = 0$ are taken as the initial values. We then obtain $$\delta_A = -\bar{\alpha}_{A\theta} \cdot \alpha_{A\theta}$$

$$\bar{\alpha}_{A\theta} = -\frac{g^\theta}{\bar{g}^\theta}, \text{ and } \alpha_{A\theta} = -\frac{1}{g^\theta}$$

where
$\bar{g}^\theta$: The distance from the principal point of the entire lens system to the object point; and
$g^\theta$: The distance from the entrance pupil of the entire lens system to the object point.

Thus, $\delta_A$ depends only on the distance, and $\delta_A < 0$, and $\delta_A{}^2 \approx 0$ are found.

In practice, when focusing is effected down to an object distance (from the object point to the image point) as short as $-25F$, the power distribution characteristic of the present invention gives $\delta_A \approx -0.042$. Therefore, equation (4) becomes:

$$IIIA\theta = IIIA - \delta_A(2V_A + (\bar{\alpha}_A')^2 - 1) \quad (6)$$

Figure 2:
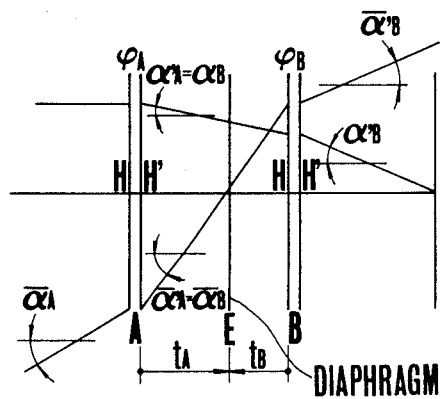
FIG. 2 is a diagram of geometry considered to define parameters representing the variation of aberrations.

Referring to FIG. 2, as Group A has a focal length FA, the refractive power of Group A is determined by $\psi_A = 1/FA$, as Group B has a focal length FB, the refractive power of Group B by $\psi_B = 1/FB$. Further representing the distance from the rear principal point of Group A to the diaphragm by tA, and the distance from the front principal point of Group B to the diaphragm by tB, and taking the direction in which the ray advances as positive, we have $\bar{\alpha}_A' = -1/(1-\psi_A t_A)$. For the given power distribution characteristic of the present invention, $\bar{\alpha}_A' \approx -1.2$ to $-1.8$ is found.

Further, since Group A is a positive lens group ahead of the diaphragm, we have $V_A < 0$. The desired equation for the magnitude of variation of the aberration coefficient of Group A is found as $$\Delta IIIA\theta = IIIA\theta - IIIA$$
$$= -2\delta_A V_A - \delta_A[(\bar{\alpha}_A') - 1].$$

We now proceed to Group B. Representing the aberration coefficient for the infinitely distant object by IIIB, we have $$III_{BP} = III_B - 2r_B II_B + r_B{}^2 I_B \quad (7)$$

where $$r_B = -(\bar{\alpha}_{BP} - \bar{\alpha}_B)/\alpha_B \quad (8)$$

$\bar{\alpha}_B$: The reduced inclination angle of a pupil-paraxial ray incident upon Group B before the diaphragm is displaced;
$\bar{\alpha}_{BP}$: The reduced inclination angle of a pupil-paraxial ray incident upon Group B after the diaphragm is displaced;
$\alpha_B$: The reduced inclination angle of an object-paraxial ray incident upon Group B before the diaphragm is displaced;
IIB: The coma aberration coefficient of Group B before the diaphragm is displaced; and
IB: The spherical aberration coefficient of Group B before the diaphragm is displaced.

Also we have $$IIIB\theta = III_{BP} - \delta_B(2V_{BP} + (\bar{\alpha}_{BP}')^2 - (\bar{\alpha}_{BP})^2) + \delta_B{}^2 I_{BP} \quad (9)$$

where $$\delta_B = \frac{\bar{\alpha}_{B\theta}}{\bar{\alpha}_{BP}}(h_{BP}\alpha_{B\theta} - h_{B\theta}\alpha_{BP}) \quad (10)$$

and for the pupil-transformed distortion aberration coefficient of Group B $$V_{BP} = V_B - r_B(3III_B{}^- + IV_B) + 2r_B{}^2 II_B \quad (11)$$

where
$\bar{\alpha}_{B\theta}$: The reduced angle of inclination of a pupil-paraxial ray incident upon Group B after the diaphragm is displaced and after the object point is displaced;
$h_{BP}$: The height of incidence of an object-paraxial ray on Group B after the diaphragm is displaced;

$h_{B\theta}$: The height of incidence of an object-paraxial ray on Group B after the diaphragm is displaced and after the object point is displaced;

$\alpha_{BP}$: The reduced inclination angle of an object-paraxial ray incident on Group B after the diaphragm is displaced;

$\alpha_{B\theta}$: The reduced inclination angle of an object-paraxial ray incident on Group B after the diaphragm is displaced and after the object point is displaced;

$\overline{\alpha}'_{BP}$: The reduced inclination angle of a pupil-paraxial ray emerging from Group B after diaphragm is displaced;

VB: The distortion aberration coefficient of Group B before the diaphragm is displaced;

IVB: The Petzval sum of Group B; and $I_{BP^s}$ The spherical aberration of the pupil of Group B after the diaphragm is displaced.

Looking upon the displacement parameters expressed by equations (8) and (10), as $\delta_B$ takes a value dependent upon the power distribution over the Group B and the position of the diaphragm, with reference to FIG. 2, we have $$\overline{\alpha}_A' = \overline{\alpha}_B = -1/(1-\psi_A \cdot t_A)$$

and, representing the $t_A$ and $t_B$ after the diaphragm only is displaced by $t_{AP}$ and $t_{BP}$ respectively, $$\overline{\alpha}_{AP}' = \overline{\alpha}_{BP} = -1/(1-\psi_A \cdot t_{AP})$$

and find $|\overline{\alpha}_{BP}| > |\overline{\alpha}_B|$ and $\alpha_B = \psi_A$.

The power distribution characteristic of the present invention gives $\delta_B \approx 0.11$ to 0.17 when focusing is effected down to an object distance as short as $-25F$. Therefore, we may safely set forth $\delta_B^2 \approx 0$.

With regard to $\delta_B$, this takes a value also depending upon the power distribution over the Group B and the position of the diaphragm. In the power distribution characteristic of the present invention, $h_{BP} < h_{B\theta}$, and $\alpha_{B\theta} < \alpha_{BP}$ are obtained, and therefore $\delta_B < 0$ is found. For the object distance of $-25F$, $\delta_B = -0.056$ is determined and may be safely taken as $\delta_B^2 = 0$.

Introducing the thus-obtained zero values of the displacement parameters into equations (7) and (9) and putting equation (7) into equation (9), we find $$III_{B\theta} \approx III_B - 2r_B II_B - 2\cdot\delta_B\{V_B - r_B(3III_B + IV_B)\} - \delta_B\{(\overline{\alpha}_{BP}')^2 - (\overline{\alpha}_{BP})^2\} \quad (12)$$

The desired equation for the magnitude of variation of the aberration coefficient of Group B is here found as: $\Delta III_{B\theta} = III_{B\theta} - III_B$.

With regard to the 3rd term in equation (12), since $\delta_B \approx 0.11$ to 0.17, and since the power distribution characteristic of the present invention gives $|V_B| >> |\delta_B(3III_B + IV_B)|$, the 3rd term or $-2\delta_B[V_B - \delta_B(3III_B + IV_B)]$ simplies to $-2\delta_B V_B$.

With regard to the 4th term or $-\delta_B[(\overline{\alpha}_{BP}')^2 - (\overline{\alpha}_{BP})^2]$, since $$\overline{\alpha}_{BP}' = \overline{\alpha}_{BP} + \psi_B(\overline{\alpha}_{BP} \cdot t_{BP}) \text{ and } \overline{\alpha}_{BP} = -1/(1-\psi_A t_{AP})$$

and since the power distribution characteristic of the present invention gives $(\overline{\alpha}_{BP}')^2 - (\overline{\alpha}_{BP})^2 = -1$ to $-1.4$, the 4th term simplifies to $-\delta_B \cdot k$.

Upon rearrangement of the foregoing equations, we arrives at the final equation:

$$\Delta III_\theta = \Delta III_{A\theta} + \Delta III_{B\theta} \approx -2\delta_A V_A - \delta_A\{(\alpha'_A)^2 - 1\} - 2r_B II_B - 2\delta_B V_B - \delta_B \cdot k \quad (13)$$

In the embodiment of the present invention, the power distribution is characterized by conditions (1) and (2). Since, within this framework, $VA \cdot VA < 0$, and from the condition for correction of distortion $VA + VB \approx 0$, as the average values are taken at $VA = -1.4$, $\delta_A = -0.042$ and $\delta_B = -0.056$, we find $-2(\delta_A V_A + \delta_B V_B) = 0.04$. Further since $\delta_B = 0.11$ to 0.17, $\overline{\alpha}'_A = -1.2$ to $-1.8$, and $k = -1$ to $-1.4$, as the average values are taken at $\delta_B = 0.14$, $\overline{\alpha}'_A = -1.5$ and $k = -1.2$, we find $\Delta III_\theta = 0$, and the average value $II_B = 0.09$.

It is evident from the foregoing that the total sum of the coma aberration coefficients of Group B plays an important role on the variation of astigmatism with focusing.

The new knowledge resulting from the foregoing theoretical analysis of the lens system having the power distribution defined by conditions (1) and (2) enables the present inventor to set forth a third condition defined by $|II_B| < 0.3$ for the range of variation of the astigmatism aberration coefficient of the entire system is limited to a minimum which is found acceptable.

It is noted that the fact that the strongest diverging surface in the movable lens group is made turn its concave curvature toward the front is essential for fulfilling the requirement $|II_B| > 0.3$. Or otherwise, it is very difficult to achieve the fulfilment of $|II_B| < 0.3$.

In the following the embodiments of the present invention will be described.

EXAMPLE 1

The first lens is a positive lens with its front surface of strong convex curvature toward the front; the second lens is a positive lens with its front surface of strong convex curvature toward the front; the third lens is a negative lens with its rear surface of strong concave curvature toward the rear; the 2nd and 3rd lenses are cemented together; the 1st to 3rd lenses are stationary along with the diaphragm; the fourth lens is a negative lens with its front surface of strong concave curvature toward the front; the 5th lens is a positive lens; the 4th and 5th lenses are cemented together; the 6th lens is a positive lens; and the 4th to 6th lenses are moved in unison to effect focusing.

Table 1 shows the numerical data in accordance with which that specific lens system can be constructed and where all the values are normalized with respect to a focal length F=1, and Table 2 shows the aberration coefficients of that lens system when focused at infinity and down to an object distance of $-25$.

Figure 3:
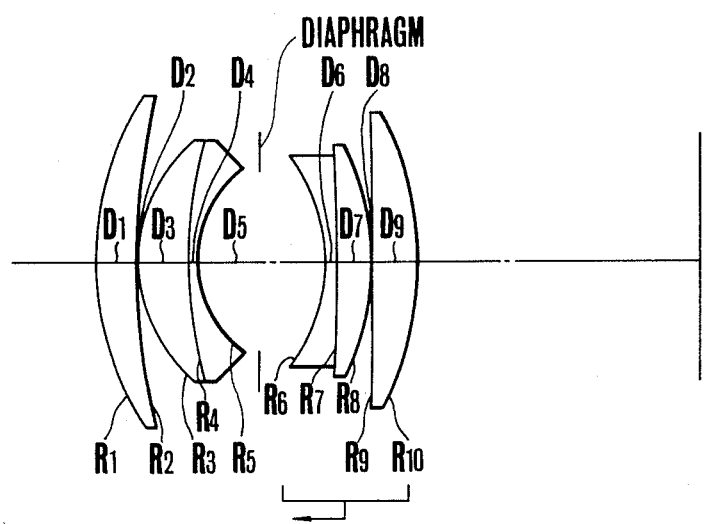
FIG. 3 is a longitudinal sectional view of an Example 1 of a specific objective according to the present invention.
Figures 4A, 4B, 4C:
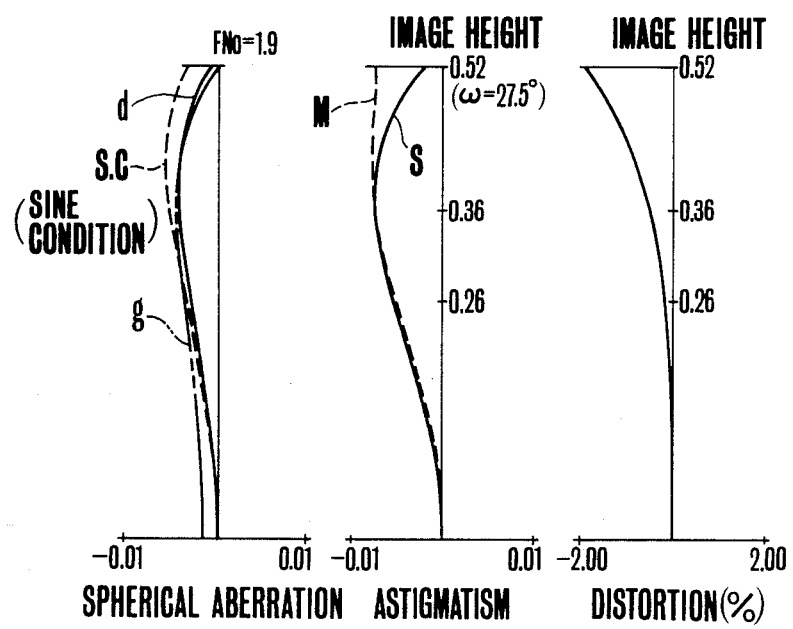
FIGS. 4A to 4C are graphic representations of the various aberrations of the lens of FIG. 3 when focused at infinity.

FIG. 3 is a lens block diagram, and FIGS. 4A to 4C are aberration curves with object at infinity. In these aberration curves and those that follow inconnection with the following examples of embodiments of the invention, the spherical aberrations are represented with respect to d-line indicated by d, g-line by g and sine condition by S.C., the astigmatisms are represented with respect to d-line only for the meridional image surface by M and the sagittal image surface by S, and the distortions are represented with respect to d-line only.

Figures 5A, 5B, 5C:
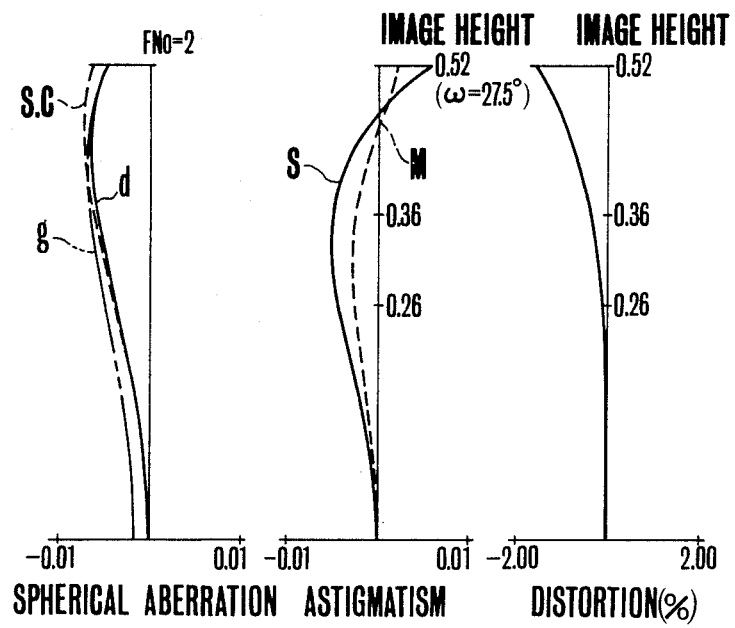
FIGS. 5A to 5c are graphic representations of the various aberrations of the same lens when focused down to a shorter object distance of $-25F$.

FIGS. 5A to 5C are aberration curves with object at $-25$, and F-number is given by effective F-number.

TABLE 1

Focal Length
Group A: 1.71480
Group B: 1.06965

| | R | D | | νd | Nd |
|---|---|---|---|---|---|
| 1 | 0.59198 | 0.08432 | | 40.9 | 1.80610 |
| 2 | 1.42818 | 0.00250 | | | 1. |
| 3 | 0.30726 | 0.10557 | | 60.7 | 1.60311 |
| 4 | 0.84121 | 0.02000 | | 31.1 | 1.68893 |
| 5 | 0.23147 | 0.12536 | 0.2641 | | 1. |
| | 0.0 | 0.13875 | | | 1. |
| 6 | −0.33443 | 0.02250 | | 32.1 | 1.67270 |
| 7 | −5.39330 | 0.06925 | | 40.9 | 1.80610 |
| 8 | −0.55177 | 0.00250 | | | 1. |
| 9 | −35.97000 | 0.09752 | | 49.6 | 1.77250 |
| 10 | −0.63254 | | | | 1. |

From Surface R5 to Diaphragm = 0.1254
Total Movement of Group B (Shortest Object Distance from Film Plane is −25) = 0.06047
Focal Length F = 1.0000090
T₁ = 0.43142386 (from 1st Surface to Entrance Pupil)
Back Focus = 0.52823598

TABLE 2

| | I | II | III | IV | V | Is |
|---|---|---|---|---|---|---|
| | | | Object Point at −∞: | | | |
| 1 | 1.191219 | 0.191258 | 0.030708 | 0.753950 | 0.125982 | −0.016291 |
| 2 | 0.012263 | −0.078462 | 0.502033 | −0.312512 | −1.212633 | 0.414310 |
| 3 | 0.932060 | 0.098868 | 0.010487 | 1.224427 | 0.130993 | −0.011184 |
| 4 | −0.085617 | 0.116868 | −0.159528 | 0.037680 | 0.166325 | −0.043644 |
| 5 | −1.795593 | −0.493460 | −0.135611 | −1.762271 | −0.521571 | 0.075101 |
| | 0.0 | 0.0 | 0.0 | 0.0 | 0.0 | 0.0 |
| 6 | −2.367147 | 0.924445 | −0.361025 | −1.202548 | 0.610624 | 0.141738 |
| 7 | 0.002136 | 0.010374 | 0.050391 | −0.008187 | 0.205004 | 0.082912 |
| 8 | 0.552896 | −0.372708 | 0.251243 | 0.808896 | −0.714641 | −0.248708 |
| 9 | −0.012295 | 0.058549 | −0.278817 | −0.012116 | 1.385457 | 0.729261 |
| 10 | 1.975922 | −0.398470 | 0.080356 | 0.689020 | −0.155154 | −0.032743 |
| | 0.0 | 0.0 | 0.0 | 0.0 | 0.0 | 0.0 |
| Σ | 0.405843 | 0.057263 | −0.009762 | 0.216338 | 0.020386 | 1.090753 |
| Group A | 0.25433 | −0.16493 | 0.24809 | −0.05873 | −1.31090 | 0.41829 |
| Group B | 0.15151 | 0.22219 | −0.25785 | 0.27506 | 1.33129 | 0.67246 |
| Σ | 0.40584 | 0.05726 | −0.00976 | 0.21634 | 0.02039 | 1.09075 |
| | | | Object Point at −25 from Film Plane: | | | |
| Group A | 0.25152 | −0.18022 | 0.19597 | −0.05873 | −1.26044 | 0.39712 |
| Group B | 0.29936 | 0.17598 | −0.22960 | 0.27506 | 1.25939 | 0.32097 |
| Σ | 0.55089 | −0.00425 | −0.03363 | 0.21634 | −0.00104 | 0.71809 |

ΔIII = −0.02387

EXAMPLE 2

This example is similar in lens construction to Example 1 except that the 2nd and 3rd lenses are not cemented together.

Table 3 lists the numerical data of the construction parameters, and Table 4 shows the aberration coefficients for the object points at −∞ and −25.

Figure 6:
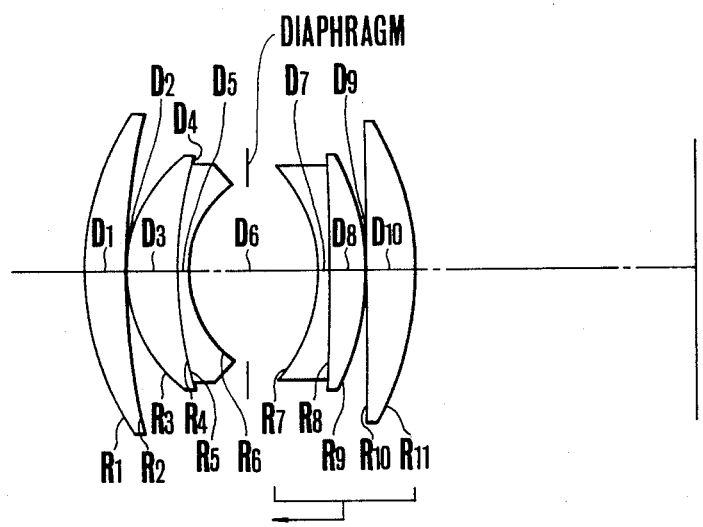
FIG. 6 is a longitudinal sectional view of an Example 2 of a specific objective according to the present invention.
Figures 7A, 7B, 7C:
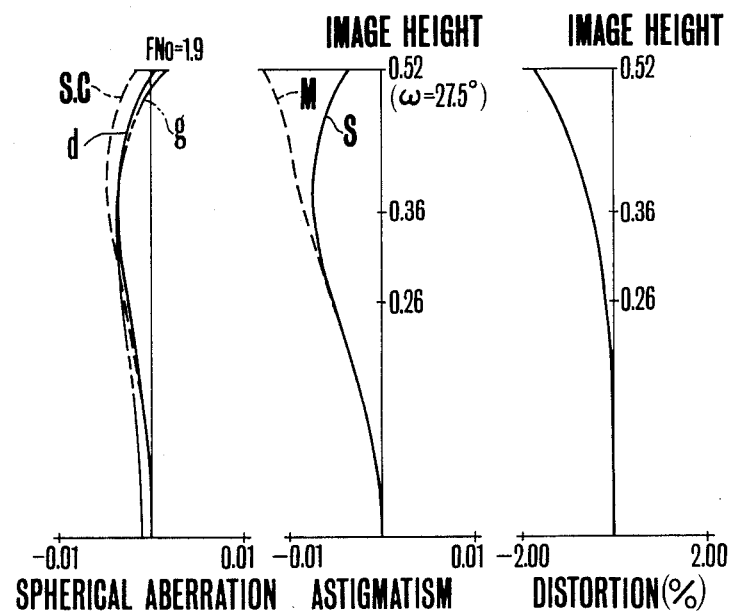
FIGS. 7A to 7C and 8A to 8C are graphic representations of the various aberrations of the objective of FIG. 6 when focused at infinity and down to the shorter object distance of $-25F$ respectively.
Figures 8A, 8B, 8C:
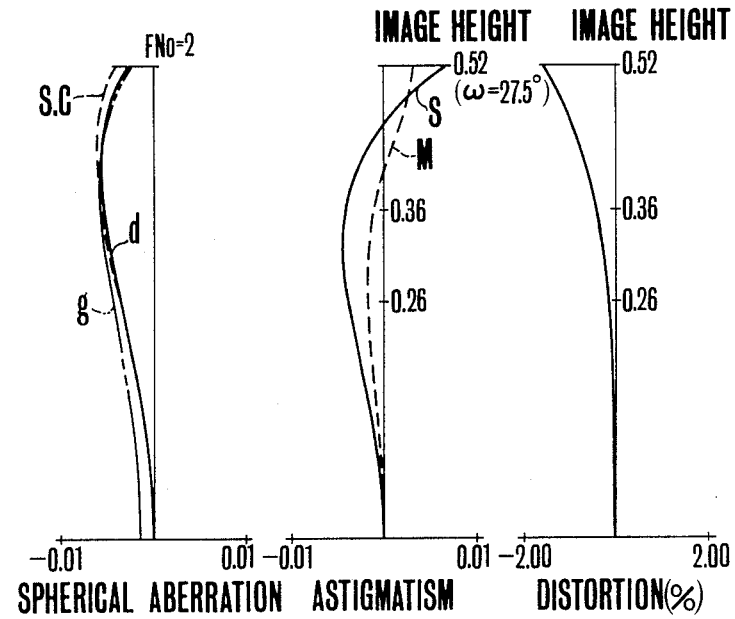

FIG. 6 shows a lens block diagram, FIG. 7 shows the aberration curves when focused at −∞, and FIG. 8 shows the aberration curves when focused down to −25.

TABLE 3

Focal Length
Group A: 1.69679
Group B: 1.05495

| | R | D | | νd | Nd |
|---|---|---|---|---|---|
| 1 | 0.58828 | 0.08629 | | 40.9 | 1.80610 |
| 2 | 1.42115 | 0.00250 | | | 1. |
| 3 | 0.30421 | 0.10346 | | 60.7 | 1.60311 |
| 4 | 0.85400 | 0.00065 | | | 1. |
| 5 | 0.84111 | 0.02000 | | 31.1 | 1.68893 |
| 6 | 0.22860 | 0.12414 | 0.2723 | | 1. |
| | | 0.14814 | | | 1. |
| 7 | −0.32874 | 0.02250 | | 32.1 | 1.67270 |
| 8 | −6.92733 | 0.07435 | | 40.9 | 1.80610 |
| 9 | −0.53667 | 0.00250 | | | 1. |
| 10 | −25.61956 | 0.09827 | | 49.6 | 1.77250 |
| 11 | −0.63830 | | | | 1. |

Axial Separation between R6 and Diaphragm: 0.1241
Total Movement of Group B (Focusing Down to −25): 0.06092
Focal Length F: 1.0000102
T₁: 0.43083668
Back Focus: 0.57807690

TABLE 4

| | I | II | III | IV | V | Is |
|---|---|---|---|---|---|---|
| | | | Object Point at −∞: | | | |
| 1 | 1.213784 | 0.191109 | 0.030090 | 0.758681 | 0.124191 | −0.015815 |
| 2 | 0.013087 | −0.081671 | 0.509668 | −0.314057 | −1.220716 | 0.415308 |
| 3 | 0.951149 | 0.100035 | 0.010521 | 1.236690 | 0.131172 | −0.011112 |
| 4 | 1.342060 | −1.782238 | 2.366788 | −0.440532 | −2.558043 | 0.684896 |
| 5 | −1.402272 | 1.877289 | −2.513217 | 0.484968 | 2.715316 | −0.722678 |
| 6 | −1.847390 | −0.502157 | −0.136496 | −1.784342 | −0.522122 | 0.074579 |
| | 0.0 | 0.0 | 0.0 | 0.0 | 0.0 | 0.0 |
| 7 | −2.373349 | 0.867995 | −0.317449 | −1.223355 | 0.563512 | 0.132581 |
| 8 | 0.002644 | 0.012004 | 0.054503 | −0.006374 | 0.218521 | 0.095789 |
| 9 | 0.601020 | −0.366833 | 0.223897 | 0.831645 | −0.644251 | −0.226314 |
| 10 | −0.015454 | 0.067229 | −0.292459 | −0.017011 | 1.346265 | 0.766074 |
| 11 | 1.898335 | −0.330045 | 0.057382 | 0.682790 | −0.128686 | −0.024009 |
| | 0.0 | 0.0 | 0.0 | 0.0 | 0.0 | 0.0 |
| Σ | 0.383614 | 0.052717 | −0.006774 | 0.209102 | 0.025159 | 1.169299 |
| Group A | 0.27042 | −0.19763 | 0.26735 | −0.05859 | −1.33020 | 0.42518 |
| Group B | 0.11320 | 0.25035 | −0.27413 | 0.26769 | 1.35536 | 0.74412 |

TABLE 4-continued

|  | I | II | III | IV | V | Is |
|---|---|---|---|---|---|---|
| Σ | 0.38361 | 0.05272 | −0.00677 | 0.20910 | 0.02516 | 1.16930 |
| | | Object Point at −25: | | | | |
| Group A | 0.26103 | −0.21101 | 0.21411 | −0.05859 | −1.28430 | 0.40704 |
| Group B | 0.25805 | 0.21050 | −0.25530 | 0.26769 | 1.29747 | 0.38502 |
| Σ | 0.51909 | −0.00052 | −0.04118 | 0.20910 | 0.01317 | 0.79206 |
| | | ΔIII = −0.03441 | | | | |

EXAMPLE 3

The first lens is a positive lens with its front surface of strong convex curvature toward the front; the second lens is a positive lens with its front surface of strong convex curvature toward the front; the third lens is a negative lens with its rear surface of strong concave curvature toward the rear; the 1st to 3rd lenses are stationary along with the diaphragm during focusing; the fourth lens is a meniscus lens of strong concave curvature toward the front; the fifth lens is a negative lens; the sixth lens is a positive lens; the 5th and 6th lenses are cemented together; and the 4th to 6th lenses are moved in unison to effect focusing.

Figure 9:
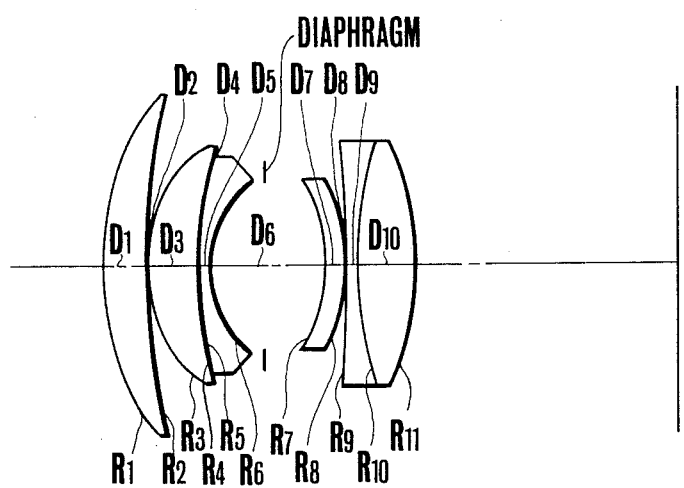
FIG. 9 is a longitudinal sectional view of Example 3 of a specific objective according to the present invention.

Table 5 lists the numerical data of the construction parameters; and Table 6 shows the aberration coefficients for the object points at −∞ and −25. FIG. 9 is a lens block diagram; FIG. 10 shows the aberration curves when focused at −∞; and FIG. 11 shows the aberration curves when focused down to −25.

TABLE 5

Focal Length
Group A: 1.69184
Group B: 1.10828

|  | R | D | νd | Nd |
|---|---|---|---|---|
| 1 | 0.55640 | 0.09565 | 40.9 | 1.80610 |
| 2 | 1.40537 | 0.00241 | | 1. |
| 3 | 0.30764 | 0.09779 | 50.9 | 1.65844 |
| 4 | 0.72123 | 0.00376 | | 1. |
| 5 | 0.78664 | 0.02410 | 26.6 | 1.76182 |
| 6 | 0.22933 | 0.24161 | | 1. |
| 7 | −0.33772 | 0.04034 | 31.1 | 1.68893 |
| 8 | −0.42778 | 0.00241 | | 1. |
| 9 | −3.18394 | 0.02410 | 42.8 | 1.56732 |
| 10 | 0.83100 | 0.11878 | 49.4 | 1.74320 |
| 11 | −0.65939 | | | 1. |

Axial Separation between R5 and Diaphragm: 0.1205
Total Movement of Group B (Focused down to −25): 0.06145
F: 1.0000041
$T_1$: 0.45027373
Back Focus: 0.51693805

TABLE 6

|  | I | II | III | IV | V | Is |
|---|---|---|---|---|---|---|
| | | Object Point at −∞: | | | | |
| 1 | 1.434659 | 0.152255 | 0.016158 | 0.802161 | 0.086845 | −0.008083 |
| 2 | 0.030164 | −0.136435 | 0.617103 | −0.317584 | −1.354744 | 0.478599 |
| 3 | 0.522301 | 0.069583 | 0.009270 | 1.290548 | 0.173168 | −0.017556 |
| 4 | 1.175001 | −1.702355 | 2.466393 | −0.550481 | −2.775796 | 0.781275 |
| 5 | −1.492471 | 2.038462 | −2.784194 | 0.549690 | 3.051954 | −0.847145 |
| 6 | −1.505713 | −0.458192 | −0.139429 | −1.885512 | −0.616194 | 0.093907 |
| 7 | −2.216482 | 1.002004 | −0.452975 | −1.207832 | 0.750800 | 0.176736 |
| 8 | 0.946597 | −0.571013 | 0.344450 | 0.953543 | −0.782984 | −0.228700 |
| 9 | −0.045568 | 0.125139 | −0.343654 | −0.113686 | 1.255943 | 0.515912 |
| 10 | 0.006718 | 0.017958 | 0.048003 | 0.077466 | 0.335390 | 0.179394 |
| 11 | 1.562859 | −0.501830 | 0.161136 | 0.646572 | −0.259353 | −0.081498 |
| | 0.0 | 0.0 | 0.0 | 0.0 | 0.0 | 0.0 |
| Σ | 0.418064 | 0.035576 | −0.057739 | 0.244886 | −0.134972 | 1.042841 |
| Group A: | 0.16394 | −0.03668 | 0.18530 | −0.11118 | −1.43477 | 0.48100 |
| Group B: | 0.25412 | 0.07226 | −0.24304 | 0.35606 | 1.29979 | 0.56184 |
| Σ | 0.41806 | 0.03558 | −0.05774 | 0.24489 | −0.13497 | 1.04284 |
| | | Object point at −25: | | | | |
| Group A: | 0.18199 | −0.06134 | 0.13010 | −0.11118 | −1.36328 | 0.44652 |
| Group B: | 0.39954 | −0.00655 | −0.16578 | 0.35606 | 1.18069 | 0.18169 |
| Σ | 0.58154 | −0.06790 | −0.03569 | 0.24489 | −0.18259 | 0.62821 |
| | | ΔIII = +0.0221 | | | | |

EXAMPLE 4

This example is similar in lens construction to Example 3, except that the 2nd and 3rd lenses are cemented together.

Table 7 lists the numerical data of the construction parameters, and Table 8 shows the aberration coefficients for the object points at −∞ and −25.

FIG. 12 is a lens block diagram; FIG. 13 shows the aberration curves when focused at −∞, and FIG. 14 shows the aberration curves when focused down to −25.

TABLE 7

Focal Length
Group A: 1.43670
Group B: 1.23916

|  | R | D | νd | Nd |
|---|---|---|---|---|
| 1 | 0.57993 | 0.09311 | 49.6 | 1.77250 |
| 2 | 1.46329 | 0.00241 | | 1. |
| 3 | 0.31778 | 0.11783 | 50.9 | 1.65844 |
| 4 | 1.74457 | 0.02410 | 30.1 | 1.69895 |
| 5 | 0.23206 | 0.12048 } 0.2612 | | 1. |
| | 0.0 | 0.14072 | | 1. |
| 6 | −0.27581 | 0.04072 | 30.1 | 1.69895 |

TABLE 7-continued

Focal Length
Group A: 1.43670
Group B: 1.23916

| | R | D | νd | Nd |
|---|---|---|---|---|
| 7 | −0.32354 | 0.0482 | | 1. |
| 8 | −4.75249 | 0.02410 | 42.8 | 1.56732 |
| 9 | 0.78693 | 0.12434 | 49.8 | 1.73500 |
| 10 | −0.83478 | | | 1. |

Axial Air Separation between R5 and Diaphragm: 0.1205
Total Movement of Group B (Focused Down to −25): 0.07465
F: 1.0000011
$T_1$: 0.47804431
Back Focus: 0.44892032

TABLE 8

| | I | II | III | IV | V | Is |
|---|---|---|---|---|---|---|
| | | | Object point at −∞: | | | |
| 1 | 1.260696 | 0.128441 | 0.013086 | 0.751520 | 0.077899 | −0.007068 |
| 2 | 0.016384 | −0.092627 | 0.523666 | −0.297839 | −1.276703 | 0.481016 |
| 3 | 0.657211 | 0.065391 | 0.006506 | 1.249376 | 0.124958 | −0.010265 |
| 4 | −0.129792 | 0.126538 | −0.123366 | 0.008241 | 0.112239 | −0.034057 |
| 5 | −0.967964 | −0.334552 | −0.115629 | −1.772860 | −0.652708 | 0.107351 |
| | 0.0 | 0.0 | 0.0 | 0.0 | 0.0 | 0.0 |
| 6 | −2.988653 | 0.944933 | −0.298763 | −1.491608 | 0.566068 | 0.130649 |
| 7 | 1.815589 | −0.618145 | 0.210457 | 1.271547 | −0.504570 | −0.129463 |
| 8 | −0.074796 | 0.179843 | −0.432421 | −0.076164 | 1.222862 | 0.665811 |
| 9 | 0.000151 | 0.000623 | 0.002579 | 0.078359 | 0.335012 | 0.241998 |
| 10 | 0.935896 | −0.409598 | 0.179262 | 0.507474 | −0.300553 | −0.137212 |
| | 0.0 | 0.0 | 0.0 | 0.0 | 0.0 | 0.0 |
| Σ | 0.524722 | −0.009152 | −0.034623 | 0.228045 | −0.295497 | 1.308758 |
| Group A: | 0.83654 | −0.10681 | 0.30426 | −0.06156 | −1.61432 | 0.53698 |
| Group B: | −0.31181 | 0.09766 | −0.33889 | 0.28961 | 1.31882 | 0.77178 |
| Σ | 0.52472 | −0.00915 | −0.03462 | 0.22805 | −0.29550 | 1.30876 |
| | | | Object Point at −25: | | | |
| Group A: | 0.87579 | −0.12412 | 0.24239 | −0.06156 | −1.55552 | 0.51250 |
| Group B: | −0.36228 | 0.12672 | −0.27491 | 0.28961 | 1.24245 | 0.23382 |
| Σ | 0.51351 | 0.00260 | −0.03252 | 0.22805 | −0.31307 | 0.74632 |
| | ΔIII = 0.0021 | | | | | |

EXAMPLE 5

This example is similar in construction to Example 3. Table 9 lists the numerical data of the construction parameters, and Table 10 shows the aberration coefficients for the object points at −∞ and −25.

Figures 16A, 16B, 16C:
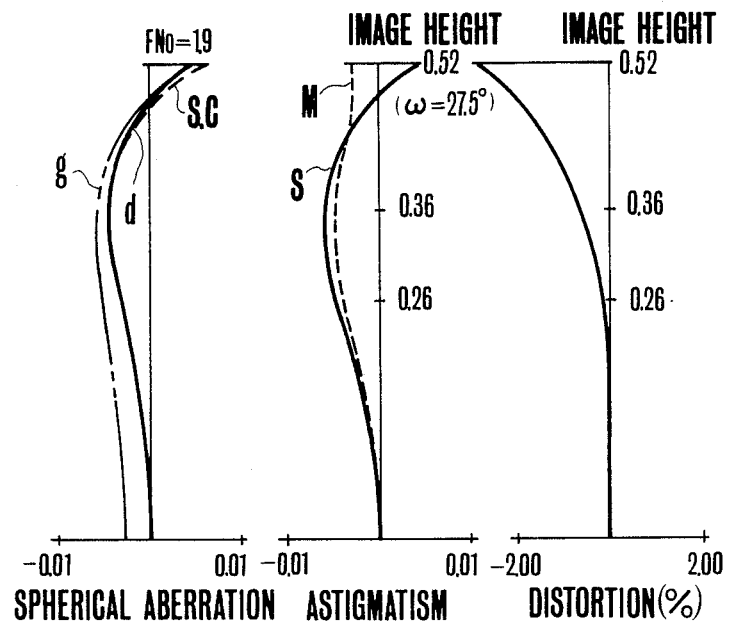
FIGS. 16A to 16C and 17A to 17C are graphic representations of the various aberrations of the objective of FIG. 15 when focused at infinity and down to the shorter object distance of $-25F$ respectively.
Figures 17A, 17B, 17C:
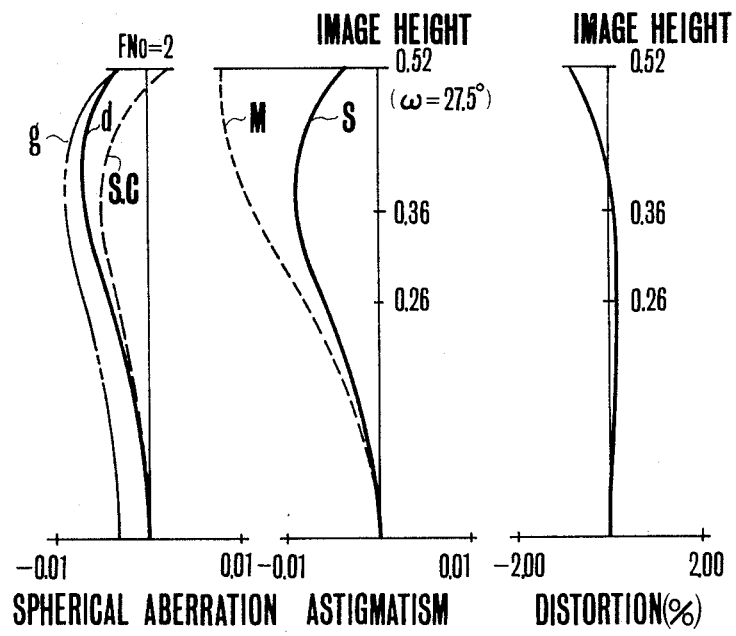

FIG. 15 is a lens block diagram, FIG. 16 shows the aberration curves when focused at −∞, and FIG. 17 shows the aberration curves when focused down to −25.

TABLE 9

Focal Length
Group A: 1.96851
Group B: 1.11410

| | R | D | νd | Nd |
|---|---|---|---|---|
| 1 | 0.66600 | 0.06835 | 49.6 | 1.77250 |
| 2 | 1.31117 | 0.00241 | | 1. |
| 3 | 0.32199 | 0.09786 | 49.6 | 1.77250 |
| 4 | 0.77484 | 0.00668 | | 1. |
| 5 | 0.93215 | 0.02410 | 31.2 | 1.66369 |
| 6 | 0.23006 | 0.10843 ⎫ 0.2180 | | 1. |
| | 0.0 | 0.10954 ⎭ | | 1. |
| 7 | −0.39622 | 0.03086 | 32.9 | 1.64991 |
| 8 | −0.53656 | 0.00241 | | 1. |
| 9 | −5.73982 | 0.02410 | 42.8 | 1.56732 |
| 10 | 0.73675 | 0.12578 | 52.3 | 1.71880 |
| 11 | −0.64677 | 0.61467 | | 1. |

Axial Air Separation between R6 and Diaphragm: 0.1084
Total Movement of Group B (Focused down to −25): 0.05526
F: 0.99998981
$T_1$: 0.36425634
Back Focus: 0.61467430

TABLE 10

| | I | II | III | IV | V | Is |
|---|---|---|---|---|---|---|
| | | | Object Point at −∞: | | | |
| 1 | 0.832326 | 0.251150 | 0.075783 | 0.654387 | 0.220325 | −0.040917 |
| 2 | 0.003763 | 0.028743 | 0.219558 | −0.332389 | −0.861891 | 0.245711 |
| 3 | 1.714596 | 0.209197 | 0.025524 | 1.353524 | 0.168257 | −0.015603 |
| 4 | 1.064622 | −1.519164 | 2.167774 | −0.562466 | −2.290698 | 0.526996 |
| 5 | −1.399058 | 1.759558 | −2.212949 | 0.427958 | 2.244935 | −0.503678 |
| 6 | −2.462402 | −0.697057 | −0.197323 | −1.733995 | −0.546718 | 0.071480 |
| | 0.0 | 0.0 | 0.0 | 0.0 | 0.0 | 0.0 |
| 7 | −1.957574 | 0.980821 | −0.491430 | −0.994141 | 0.744329 | 0.145790 |
| 8 | 0.592523 | −0.462733 | 0.361373 | 0.734123 | −0.855532 | −0.208147 |
| 9 | −0.014457 | 0.058155 | −0.233941 | −0.063062 | 1.194761 | 0.358399 |
| 10 | 0.027698 | 0.046550 | 0.078236 | 0.076322 | 0.259759 | 0.100093 |
| 11 | 2.087437 | −0.637370 | 0.194612 | 0.646591 | −0.256850 | −0.069637 |
| Σ | 0.489473 | 0.017849 | −0.012781 | 0.206850 | 0.020677 | 0.610486 |
| Group A: | −0.24615 | 0.03243 | 0.07837 | −0.19298 | −1.06579 | 0.28399 |
| Group B: | 0.73563 | −0.01458 | −0.09115 | 0.39983 | 1.08647 | 0.32650 |
| Σ | 0.48947 | 0.01785 | −0.01278 | 0.20685 | 0.02068 | 0.61049 |
| | | | Object Point at −25: | | | |
| Group A: | −0.25690 | 0.00202 | 0.03689 | −0.19298 | −1.00556 | 0.25847 |
| Group B: | 0.97366 | −0.13054 | −0.00776 | 0.39983 | 0.94357 | 0.08998 |
| Σ | 0.71675 | −0.12852 | 0.02913 | 0.20685 | −0.06200 | 0.34846 |

The values of the factors and terms FA/F, FB/F, IIB, $\bar{\alpha}'_A$ and $\Delta III\theta$ are listed in Table 11 below:

TABLE II

| Example | $F_A/F$ | $F_B/F$ | $II_B$ | $\bar{\alpha}'_A$ | $\Delta III_\theta$ |
|---|---|---|---|---|---|
| 1 | 1.715 | 1.067 | 0.22219 | −1.53117 | −0.02387 |
| 2 | 1.697 | 1.055 | 0.25035 | −1.53493 | −0.03441 |
| 3 | 1.692 | 1.108 | 0.07226 | −1.58449 | 0.0221 |
| 4 | 1.437 | 1.239 | 0.09766 | −1.64385 | 0.0021 |
| 5 | 2.035 | 1.099 | −0.04435 | −1.45390 | 0.0343 |

It is therefore to be understood that such a modification falls within the scope and spirit of the present invention.

Table 12 gives another evidence for the proof that the transforming equations for the variation of aberrations revealed in the present invention is correct, when Example 1 is compared with a conventional objective of similar construction disclosed in West German Pat. No. 1095539. The calculated values by the transforming equations are in good agreement with those calculated not based on the transforming equations.

TABLE 12

| Group | Transformation | | Example 1 | DP1095539 |
|---|---|---|---|---|
| A | $\theta$ | $\delta_A$ | −0.041361 | −0.043773 |
| | | $(\bar{\alpha}'_A)$ | −1.53118 | −1.398812 |
| | | $V_A$ | −1.3109 | −1.08672 |
| | | $\Delta III_{A\theta} = -2\delta_A V_A - \delta_A\{(\bar{\alpha}'_A)^2 - 1\}$ | −0.05283 | −0.053614 |
| B | P | $r_B$ | $\dfrac{-\{(-1.6185) - (-1.53118)\}}{0.58316}$ | $\dfrac{-\{(-1.463) - (-1.3988)\}}{0.53006}$ |
| | | | = 0.14987 | = 0.12137 |
| | | $II_B$ | 0.22219 | 0.39719 |
| | | $-2r_B II_B$ | −0.0659923 | −0.096414 |
| | | $\bar{\alpha}_{B\theta}\sqrt{\alpha_{BP}}$ | $\dfrac{+1.51142}{1.6185} = 0.933797$ | $\dfrac{1.380176}{1.463146} = 0.9432934$ |
| | | $h_{BP}\alpha_{B\theta} - h_{B\theta}\alpha_{BP}$ | (0.57218)·(0.5266) − (0.62041)·(0.5832) | (0.64914)·(0.47516) − (0.69378)·(0.530069) |
| | | | = −0.060472 | = −0.059299 |
| | | $\delta_B$ | −0.056469 | −0.055936 |
| | | $-r_B(3III_B + P_B)$ | $\dfrac{-r_B(3\cdot(-0.2579) + 0.27506)}{0.07471}$ | $\dfrac{-r_B(3\cdot(-0.3595) + 0.20941)}{0.10549}$ |
| | | $\dfrac{2V_{BP}}{(\bar{\alpha}'_{BP})^2 - (\bar{\alpha}_{BP})^2}$ | $\dfrac{2.84092}{(1.172377)^2 - (1.618574)^2} = \dfrac{2.84092}{-1.245314}$ | $\dfrac{2.48866}{1.013736^2 - 1.463146^2} = \dfrac{2.48866}{-1.113136}$ |
| | | $-\delta_B(2V_{BP} + (\bar{\alpha}'_{BP})^2 - (\bar{\alpha}_{BP})^2)$ | 0.090102 | 0.0769413 |
| | | $\Delta III_{B\theta}$ | 0.0241 | −0.01947 |
| | | $\Delta III_\theta = \Delta III_A + \Delta III_B$ | 0.02873 | −0.07308 |
| | | $\Delta III_\theta$ obtained without transformation | 0.02387 | −0.07414 |

Looking upon the values of $II_B$, we have Example 2 > Example 1 > Example 4 > Example 3 > Example 5, and find that $\Delta III_\theta$ takes the values in the correspondingly reversed order as Example 2 < Example 1 < Example 4 < Example 3 < Example 5.

A further interrelationship is found, as is also seen from the aberration curves, that it is in the shortest focusing position that the meridional field is curved most strongly toward the positive side in Example 2 and toward the negative side in Example 5.

From these facts it is evident that the inequality of condition which is set forth as the desired requisite in the present invention is so very appropriate.

Though Examples 1 to 5 each adopt all the lens components lying behind the diaphragm as a movable group in unison, it is also possible that even with the provision of a lens component of weak power which is stationary in rear of the movable lens components during focusing, the residual aberrations are maintained stable throughout the focusing range, provided that the inequalities of condition set forth in the present invention are satisfied.

What is claimed is:

1. A focusing-in-part lens system comprising:
frontmost lens means having a positive refractive power and maintained stationary during changing of the object distance, a fixed diaphragm arranged on the image side of said frontmost lens means, and rear lens means arranged on the image side of said diaphragm, said rear lens means including an axially movable lens group for changing of the object distance consisting of a plurality of lenses and having a positive refractive power with the strongest diverging surface in this group with its concave curvature toward the front;
said lens system satisfying the condition of $1.2 < FA/F < 2.2$ wherein F represents the focal length of the whole system, FA represents the focal length of the lens means closer to the object than said movable lens group of the rear lens means.

2. A lens system as described in claim 1, satisfying the following requirements:

$$0.9 < FB/F < 1.4$$

where F is the focal length of the entire system; and FB is the focal length of said movable lens group.

3. A lens system as described in claim 1, where when a paraxial image of said diaphragm by said front lens means is taken as an entrance pupil, and the 3rd order coma aberration coefficient of the entire system is calculated for an object at infinity, the sum of the part of the 3rd-order coma aberration which is assigned to said movable lens group, IIB, satisfies the following requirement:

$$-0.3 < IIB < 0.3.$$

4. A lens system as described in claim 1, wherein said strongest diverging surface is adjacent to said diaphragm.

* * * * *